United States Patent [19]
Brown

[11] 3,811,384
[45] May 21, 1974

[54] VEHICLE DRIVE
[75] Inventor: Newton D. Brown, Cuyahoga Falls, Ohio
[73] Assignee: The Goodyear Tire & Rubber Company, Akron, Ohio
[22] Filed: Apr. 10, 1972
[21] Appl. No.: 242,633

[52] U.S. Cl. .................. 104/147, 105/26, 104/1 A
[51] Int. Cl. ............................................ B61b 13/00
[58] Field of Search .......... 104/118, 119, 120, 121, 104/139, 140, 32, 33, 1 A, 147, 148, 165, 168; 105/26, 141, 144, 145, 178; 180/7 R

[56] References Cited
UNITED STATES PATENTS
| | | | |
|---|---|---|---|
| 3,001,601 | 9/1961 | Aghnides | 180/7 R |
| 2,068,403 | 1/1937 | Ekstrom | 104/147 A |
| 530,113 | 12/1894 | Mather | 104/119 |
| 82,026 | 9/1868 | Childe | 104/33 |
| 137,308 | 4/1873 | McCauley | 105/178 |
| 3,690,267 | 9/1972 | Sutton | 104/147 R |

Primary Examiner—M. Henson Wood, Jr.
Assistant Examiner—D. W. Keen
Attorney, Agent, or Firm—F. W. Brunner; R. P. Yaist; Frederick K. Lacher

[57] ABSTRACT

A variable speed drive mechanism in which the drive wheel has a radially extending driving surface and propels a vehicle at different speeds or changes the speed of the vehicle in response to the radial position at which a supporting rail engages the wheel. A moving cable in a raceway below the vehicle drives a pulley on the vehicle which rotates the drive wheel. The direction in which the vehicle is propelled is controlled by guide pulleys in engagement with the cable and by a guide wheel movable in the raceway slot.

10 Claims, 6 Drawing Figures

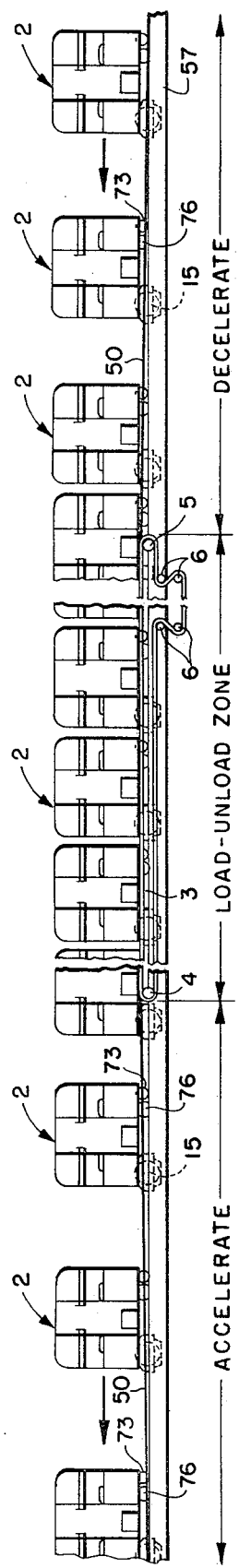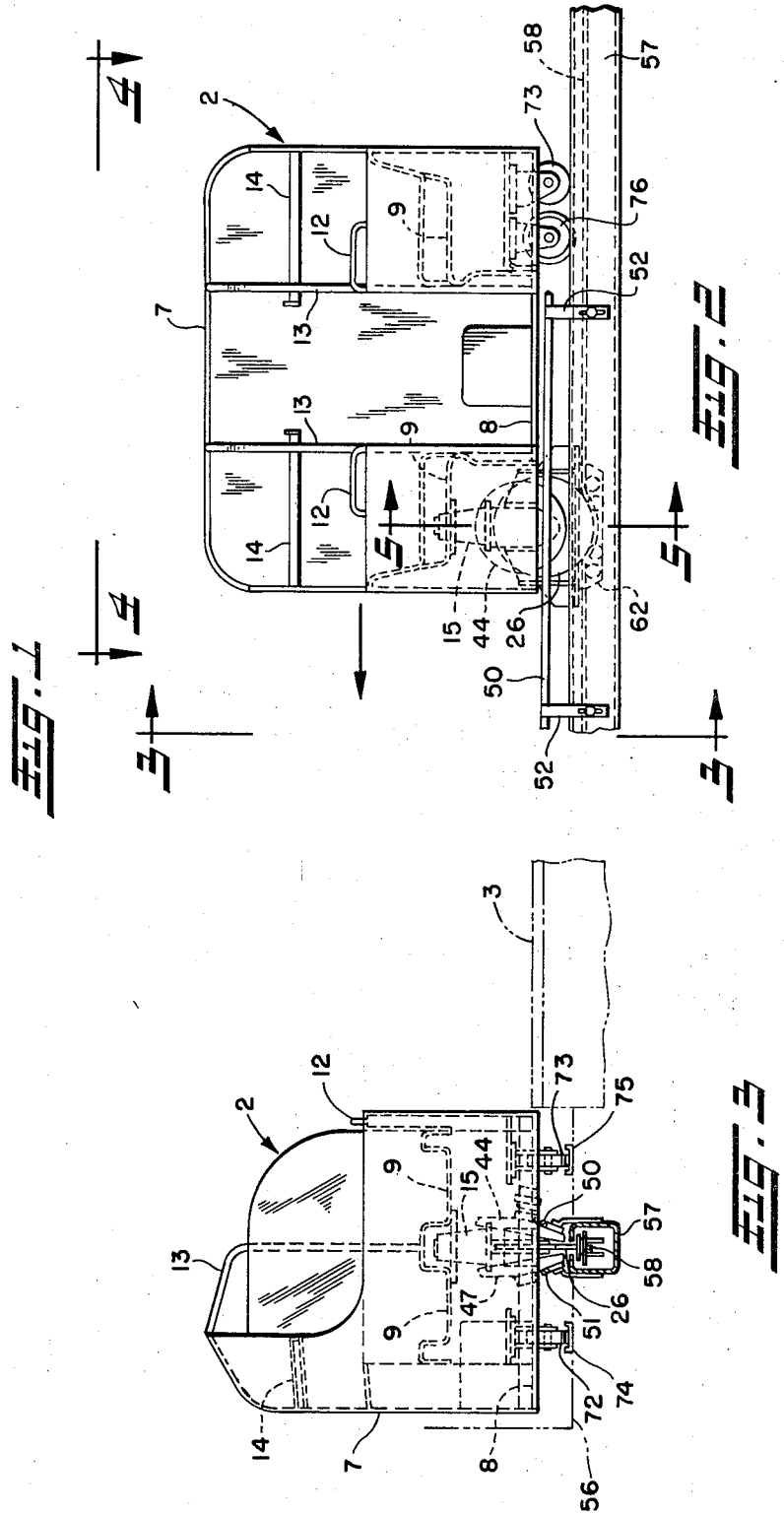

PATENTED MAY 21 1974

VEHICLE DRIVE

This invention relates generally, as indicated, to a driving mechanism for propelling a vehicle at a predetermined speed and for accelerating and decelerating the vehicle. This speed control is especially important in passenger carrying vehicle systems where it is necessary to propel the vehicle at slow speeds in stations where passengers are entering and leaving the vehicles and at higher speeds between the stations.

Heretofore, passenger carrying vehicles of this type have been supported on low speed and high speed belts connected by a series of rollers for accelerating or decelerating the vehicles. The speeds of rotation of the rollers have been varied by using individual motors rotating at the different speeds necessary to change the speed of the vehicles. The initial cost of the system is substantial because of the number of motors and drives required. This also may require a substantial amount of maintenance because of the number of drives and moving parts.

The economy of cable and rope drives is evident because of the simplicity of the apparatus and this type of drive has been used over the years. One of the most famous applications is the San Francisco cable car system in which the cable moves at a constant speed in a raceway below the ground and mechanism is provided on the car to grip the cables when forward movement is desired and to release the grip and apply brakes to stop the vehicle. Although this system and other systems have been operated over the years, they have required an operator to apply the brakes and grip the cables. These systems have not been adaptable to automatic operation where the speeds and changes in speeds are predetermined and an operator is not on the vehicle.

With the foregoing in mind, it is the principal object of this invention to provide a vehicle drive in which the speed of rotation of the driving wheel is substantially constant; however, the speed of the vehicle can be varied.

Another object of this invention is to provide a cable drive for rotating the driving wheel.

A further object is to provide a driving wheel having a driving surface of different diameters for engagement with a rail to propel the vehicle at variable speeds depending upon the effective driving diameter in engagement with the rail.

A still further object is to provide a driven pulley in engagement with a moving cable and connected to the driving wheel by a clutch to disconnect the drive for positioning the vehicle.

Another object of the invention is to provide for locating the cable under the supporting surface and positioning at least a part of the driven pulley below the surface for engagement with the cable.

A further object is to provide guide pulleys for directing the cable against the driven pulley and supporting the cable in the area of the vehicle.

A still further object is to provide a guide wheel for traveling in the slot of the raceway.

These and other objects of the present invention may be provided through the driving wheel structure which includes a driven pulley in engagement with the cable. Rails supporting the driving wheel are positioned so that they engage the wheel at predetermined radial positions causing the drive wheel to propel the vehicle at predetermined speeds. Acceleration or deceleration may be obtained by canting the rails causing a progressively different effective driving diameter in engagement with the rails. Guide pulleys are mounted on the driving wheel structure to hold the cable in engagement with the driven pulley and turn the structure so that the vehicle follows the raceway in which the cable is traveling.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 1 is a schematic side elevational view of a portion of a passenger conveyor system incorporating the preferred form of mechanism for accelerating, decelerating and propelling vehicles in the low speed load-unload zone.

FIG. 2 is an enlarged side elevational view of one of the vehicles in the load-unload zone, parts being broken away.

FIG. 3 is a front elevation of one of the vehicles taken along the plane of line 3—3 of FIG. 2 with the supporting surface and moving belt shown in chain-dotted lines and parts being broken away.

Figure 4:
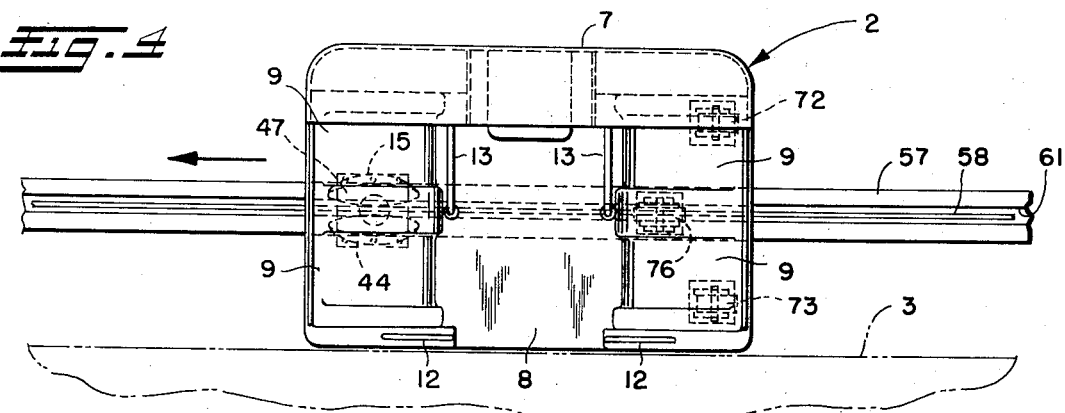
FIG. 4 is a plan view of the vehicle shown in FIG. 2 taken along the plane of line 4—4 of FIG. 2, parts being broken away.

Referring to FIG. 1, there is schematically shown a passenger carrying vehicle system 1 showing the zones in which vehicles 2 decelerate, travel at a low speed in the load-unload zone and then accelerate to a high speed zone, which is not shown. In the load-unload zone, the passengers board or leave the vehicles 2 from a moving platform traveling at the same speed as the vehicles which in this case is a moving belt 3 supported by rollers at the upper run which are not shown. The belt 3 passes over end pulleys 4 and 5 and around auxiliary pulleys 6 at the lower run of the conveyor, as shown in FIG. 1.

Referring to FIGS. 2, 3 and 4, a more detailed showing of one of the vehicles 2 is found. Each of the vehicles 2 has a body 7 which may include a floor 8, seats 9, handles 12 and stanchions 13 for supporting the passengers, baggage racks 14 and, if desired, transparent windshields at the ends of the passenger compartment. As shown in FIG. 3, the floor 8 has the same elevation as the belt 3 of the moving platform in the load-unload zone so that passengers may walk from the vehicle to the platform which is moving at the same speed.

The direction in which the vehicles 2 move is shown by arrows in FIGS. 1, 2 and 4 and it will be noted that a driving wheel structure 15 is mounted on the body 7 under the seats 9 at the forward end of the vehicles. The driving wheel structure 15 is shown in greater detail in FIGS. 5 and 6. A housing 16 has a flange 17 which is bolted to the seats 9 of the body 7 and has a sleeve 18 for receiving a spindle 19 suitably supported on bearings 23 and fastened to a frame 24 which is rotatable about an axis through the spindle. The frame 24 has longitudinally extending side members 25 for supporting a driven pulley 26 in bearings 27 about an axis A—A. The driven pulley 26 has a shaft 28 rotatably supported in the bearings 27 and a spur gear 29 is mounted on the shaft in meshing engagement with a cone gear 30. The cone gear 30 is mounted on a driving wheel shaft 34 supported in bearings 35 in one of the side members 25 with the end of the shaft being keyed to a conical clutch member 36 having a threaded cylindrical sleeve for adjustment in a direction axially of the shaft. A washer 37 is mounted on the end of the shaft 34 and a compression spring 38 is disposed between the washer and the conical clutch member 36 to urge the conical clutch member into engagement with a tapered surface 39 on hub 40 of a driving wheel 44 which is rotatably mounted on the shaft in bearings 45.

Figure 5:
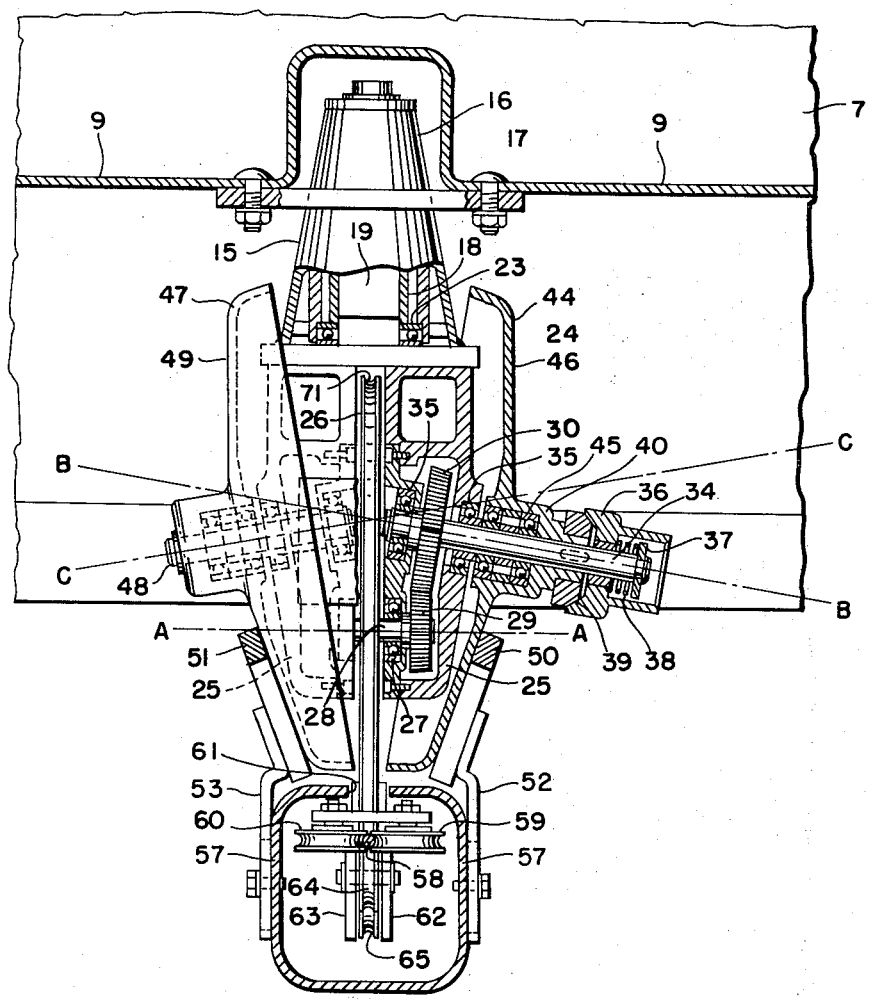
FIG. 5 is an enlarged fragmentary sectional view of the driving wheel structure taken along the plane of line 5—5 of FIG. 2.

The driving wheel 44 is rotatable about the shaft 34 which has a tilted axis B—B as shown in FIG. 5. The driving wheel 44 has a radially extending driving surface 46 in which the diameter varies axially of the wheel.

A second wheel 47 is rotatably mounted on the other side member 25 on the opposite side of the driving wheel structure 15 for rotation on a shaft 48 about a tilted axis C—C. Bearings mounted in the side member 25 rotatably support the shaft 48. The second wheel 47 also has a radially extending surface 49 with the diameter varying axially of the wheel.

The driving wheel 44 and the second wheel 47 are supported by rails 50 and 51 in engagement with the radially extending driving surfaces 46 and 49 of the wheels. The rails 50 and 51 are mounted on brackets 52 and 53 which in turn are mounted on a tubular raceway member 57 located beneath the vehicles 2 and extends along the path of the conveyor system 1 beneath a supporting surface 56 shown in FIG. 3. The rails 50 and 51 are generally parallel with the driving wheel 44 and second wheel 47 interposed between the two rails. As shown in FIGS. 1 and 5, the rails 50 and 51 may be canted so as to cause contact with the radially extending driving surface 46 at different radial positions to provide for acceleration or deceleration of the vehicles 2.

A cable 58 is movable within the raceway 57 and may be driven by suitable power means, not shown. At the forward and rearward ends of the side members 25, horizontal guide pulleys 59 and 60 are mounted in pairs and have grooves at the outer periphery to retain the cable 58. The ends of the side members 25 extend downwardly through a slot 61 in the raceway 57 and have connecting members 62 and 63 extending below the lower portion of the driven pulley 26 which also extends downwardly into the raceway. Vertical guide pulleys 64, 65, 66 and 67 are rotatably mounted between the connecting members 62 and 63 and urge the cable 58 against a grooved peripheral driving surface 71 of the driven pulley 26.

As shown more clearly in FIGS. 2 and 3, the rear of each of the vehicles 2 is supported by supporting wheels such as casters 72 and 73 which run in tracks such as channels 74 and 75 fastened to the supporting surface 56 and extending along the path of the vehicle system. It can be seen from FIG. 3 that these casters 72 and 73 are mounted on the body 7 of the vehicles at positions on opposite sides of each vehicle 2 and on opposite sides of the raceway member 57.

A guide wheel 76 may be mounted on the body 7 between the casters 72 and 73 and has a diameter greater than the diameter of the casters so as to extend into the slot 61 of the raceway member 57 and thereby guide the movement of the vehicles 2.

The cable 58 is held in position in the raceway member 57 by the vehicles 2 in the area of the vehicles; however, other apparatus not shown may be used to guide the cable in other areas along the vehicle system.

Figure 6:
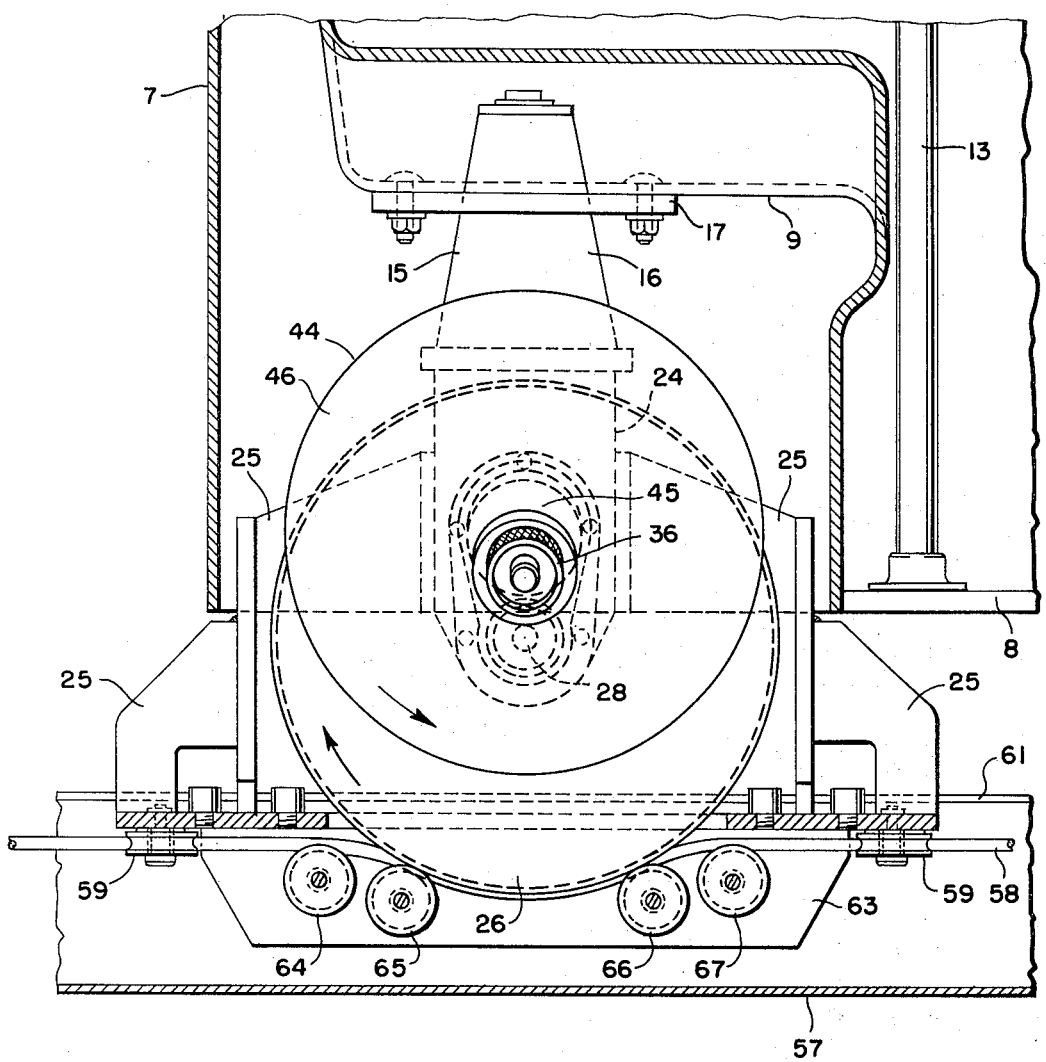
FIG. 6 is a fragmentary side elevational view of the driving wheel structure shown in FIG. 5, parts being sectioned and broken away.

In operation, the cable 58 is driven by suitable means at a constant speed in the direction in which the vehicles 2 are to be moved. The vertical guide pulleys 64, 65, 66 and 67 urge the cable 58 against the peripheral driving surface 71 of the driven pulley 26 and cause the pulley to rotate in a clockwise direction, as shown in FIG. 6. The rotation of the driven pulley 26 causes the spur gear 29 to rotate on the shaft 28 in meshing engagement with the cone gear 30 which turns the shaft 34 of the driving wheel 44 in a counterclockwise direction and this motion is transmitted to the driving wheel through the clutch member 36 and hub 40. The counterclockwise movement of the driving wheel 44, as shown in FIG. 6, causes the radially extending driving surface 46 of the driving wheel to roll on the rail 50 and propel the vehicle 2 along the channels 74 and 75. The effective rolling diameter is the distance between the point of engagement of the rail 50 and the axis B—B of the wheel 44. As shown in FIG. 5, this distance is small and accordingly the vehicle 2 is propelled at a low speed. It will be noted that the rail 51 contacts the surface of the second wheel 47 at a parallel position. By changing the position of the rails 50 and 51, as shown in FIG. 1, acceleration and deceleration can be obtained as desired.

The frame 24 with spindle 19 may rotate in sleeve 18 of the housing 16 and this rotation is controlled by the horizontal guide pulleys 59 and 60 which engage the cable 58 at the front and rear of the driven pulley 26. These guide pulleys 59 and 60 help to control the direction in which the vehicles 2 are propelled.

When it is desired to change the relative positions of the vehicles 2, the conical clutch member 36 may be unscrewed out of contact with the tapered surface 39 of the hub 40 on the driving wheel 44 and in this condition, the shaft 34 may continue to rotate but the driving wheel will not be turned and the vehicle may be moved along the raceway at will.

At intervals along the raceway member 57 the covering plates (not shown) at the sides of the slots 61 are removable so that the driving wheel structure 15 may be lifted out of the raceway and the vehicle 2 removed for repair or storage.

It is understood that the rails 50 and 51 may be adjustable and the amount these rails are canted can be changed to provide the desired acceleration or deceleration. Also, the speed in the high speed zone and the low speed zone can be regulated by either lowering the rails 50 and 51 to obtain a high speed or raising the rails to obtain a lower speed.

From the foregoing, it is evident that a desired speed as well as acceleration and deceleration of the vehicles 2 can be obtained by using a relatively simple cable propelled construction herein described and shown. While certain representative embodiments and details have been shown for the purpose of illustrating the invention, it will be apparent to those skilled in the art that various changes and modifications may be made therein without departing from the spirit or scope of the invention.

I claim:

1. A vehicle driving and supporting mechanism comprising a structure mounted on the vehicle, a driving wheel rotatably mounted on said structure, means for rotating said wheel including a driven pulley rotatably mounted on said structure for engagement with an endless member movably driven along a predetermined path and a driving connection between said driven pulley and said wheel, and said wheel having a radially extending driving surface for engagement of said wheel with a supporting rail at different radial positions along said surface whereby the vehicle will be driven at different speeds.

2. A vehicle driving and supporting mechanism according to claim 1 wherein said structure is mounted on the underside of the vehicle and said driven pulley extends below said driving wheel for engagement with said endless member in a raceway beneath the vehicle.

3. A vehicle driving and supporting mechanism according to claim 2 wherein vertical guide pulleys are mounted on said structure for directing said endless member into driving engagement with said pulley.

4. A vehicle driving and supporting mechanism according to claim 3 wherein said structure is mounted on the vehicle for turning movement of said structure relative to the vehicle and horizontal guide pulleys are mounted on said structure for engagement with said endless member at spaced-apart positions whereby said structure is turned so that said driven pulley is in alignment with said endless member.

5. A vehicle driving and supporting mechanism according to claim 2 wherein a guide wheel is rotatably mounted on the vehicle at a position spaced from said structure along the raceway beneath the vehicle and said guide wheel extends into a slot in the raceway for guiding the movement of the vehicle.

6. A vehicle driving and supporting mechanism according to claim 5 wherein a pair of supporting casters are mounted on the underside of the vehicle at opposite sides of said guide wheel for rolling engagement in tracks on both sides of the raceway.

7. A vehicle driving and supporting mechanism according to claim 1 wherein said driving connection between said driven pulley and said wheel includes clutch means for disengaging and engaging said driving connection to move the vehicle independently of the rotation of said driven pulley.

8. A vehicle driving and supporting mechanism comprising a structure mounted on the vehicle, a supporting rail, a driving wheel rotatably mounted on said structure for rotation about a substantially fixed axis relative to the vehicle, means for rotating said wheel, at least a portion of said wheel having a radially extending driving surface for engagement of said wheel with said supporting rail at different radial positions along said surface whereby the vehicle will be driven at different speeds and a guide wheel rotatably mounted on the vehicle at a position spaced from said structure for movement in a slot in the surface below the vehicle for guiding the movement of the vehicle.

9. A vehicle driving and supporting mechanism comprising a structure mounted on the vehicle, a supporting rail, a driving wheel rotatably mounted on said structure for rotation about a substantially fixed axis relative to the vehicle, means for rotating said wheel, at least a portion of said wheel having a radially extending driving surface for engagement of said wheel with said supporting rail at different radial positions along said surface whereby the vehicle will be driven at different speeds and casters rotatably mounted on the underside of the vehicle for rolling engagement in tracks under the vehicle for supporting at least part of the weight of the vehicle.

10. A vehicle driving and supporting mechanism comprising a structure mounted on the vehicle, a supporting rail, a second rail spaced from said supporting rail, a driving wheel rotatably mounted on said structure for rotation about a substantially fixed axis relative to the vehicle, means for rotating said driving wheel and at least a portion of said driving wheel having a radially extending driving surface for engagement of said driving wheel with said supporting rail, a second wheel rotatably mounted on the opposite side of said structure from said driving wheel for rotation about a substantially fixed second axis relative to the vehicle, at least a portion of said second wheel having a radially extending supporting surface for engagement with said second rail, said second rail being mounted at a diverging angle to said supporting rail to change the distance between said second rail and said supporting rail so as to contact said radially extending supporting surface of said second wheel and said radially extending driving surface of said driving wheel at different radial positions and thereby provide for acceleration or deceleration of the vehicle, and said driving wheel and said second wheel being interposed between said supporting rail and said second rail.

* * * * *